US012654469B2

(12) United States Patent
Kersten et al.

(10) Patent No.: US 12,654,469 B2
(45) Date of Patent: Jun. 16, 2026

(54) STEAM TREATMENT DEVICE COMPRISING A CONVEYOR FOR PRINT MEDIA

(71) Applicant: Canon Production Printing Holding B.V., Venlo (NL)

(72) Inventors: Stan H.P. Kersten, Venlo (NL); Johannes Regler, Venlo (NL); Marcel O.E. Demandt, Venlo (NL)

(73) Assignee: Canon Production Printing Holding B.V., Venlo (NL)

( * ) Notice: Subject to any disclaimer, the term of this patent is extended or adjusted under 35 U.S.C. 154(b) by 150 days.

(21) Appl. No.: 18/662,278

(22) Filed: May 13, 2024

(65) Prior Publication Data

US 2024/0391252 A1 Nov. 28, 2024

(30) Foreign Application Priority Data

May 26, 2023 (EP) .................................... 23175818

(51) Int. Cl.
*B41J 11/00* (2006.01)
*B41J 13/08* (2006.01)
*B65H 5/22* (2006.01)

(52) U.S. Cl.
CPC ........ *B41J 11/0005* (2013.01); *B41J 11/0015* (2013.01); *B41J 11/0085* (2013.01); *B41J 13/08* (2013.01); *B65H 5/224* (2013.01); *B65H 2406/32* (2013.01)

(58) Field of Classification Search
None
See application file for complete search history.

(56) References Cited

U.S. PATENT DOCUMENTS

2013/0194367 A1 8/2013 Chiwata et al.
2014/0368590 A1* 12/2014 Shima .................... B41J 11/002 347/102
2018/0229516 A1 8/2018 Cloots

OTHER PUBLICATIONS

European Search Report, issued in Application No. 23 17 5818, dated Oct. 28, 2023.

* cited by examiner

*Primary Examiner* — Bradley W Thies
(74) *Attorney, Agent, or Firm* — Birch, Stewart, Kolasch & Birch, LLP

(57) ABSTRACT

Deformation is reduced or prevented in a printed print medium during steam treatment by a print medium treatment device for a printer. The print medium treatment device includes a steam treatment unit for treating a first side of a print medium with steam, the steam treatment unit including a steam generator connectable to a steam chamber; and a conveyor for transporting the print medium through the steam chamber. The conveyor includes a holding device for engaging a second side of the print medium opposite the first side, such that the print medium is flattened against the conveyor.

18 Claims, 1 Drawing Sheet

STEAM TREATMENT DEVICE COMPRISING A CONVEYOR FOR PRINT MEDIA

BACKGROUND OF THE INVENTION

1. Field of the Invention

The invention relates to a print medium treatment device, a printer, and a method for treating print media.

2. Description of Background Art

A print medium treatment device, specifically a steam treatment device comprising a steam treatment unit for treating a first side of a print medium with steam. The steam treatment unit comprises a steam generator connectable to a steam chamber. A conveyor is preferably provided for transporting the print medium through the steam chamber. The print medium, such as a sheet as paper, is exposed to heated steam inside the steam chamber to adjust one or more properties of the print medium and/or the marking material deposited on the print medium. For example, when inkjet printing on a print medium, the glossiness of the jetted marking material on the print medium may be improved by allowing the steam to interact with the marking material after said marking material has been dried on the print medium. The steam may remove from or add to the dried marking material certain components, so that the visual appearance of the marking material is changed. It was however found that when exposing a printed print medium to heated steam, this could induce deformation, specifically wrinkling, in the print medium. The steam may interact with the material of the print medium e.g. by becoming absorbed in the print medium and causing it to deform. The steam may further interact with the marking material on the print medium, e.g. by stimulating the absorption of certain components such as (co) solvents, which may consequently result in deformation of the print medium.

SUMMARY OF THE INVENTION

It is an object of the invention to provide an improved print medium treatment device, specifically one wherein deformation of the print medium is reduced or prevented.

In accordance with the present invention, a print medium treatment device for a printer according to claim 1, a printer according to claim 14, and a method of treating print media in a printer according to claim 14 are provided.

The print medium treatment device comprises:

- a steam treatment unit for treating a first side of a print medium with steam, the steam treatment unit comprising a steam generator connectable to a steam chamber;
- a conveyor for transporting the print medium through the steam chamber, The print medium treatment device is characterized in that the conveyor comprises a holding device for engaging a second side of the print medium opposite the first side, such that the print medium is flattened against the conveyor.

The holding device holds the print medium fixed flatly against the conveyor as the print medium is exposed to steam inside the steam chamber. Since the print medium is held flat against the conveyor, its ability is deform is reduced. In consequence, the holding will reduce or even prevent deformation of the sheet due to its exposure to the (heated) steam. The holding is applied to the second side of the sheet, such that the first side is free for exposure to the steam. Thereby the object of the present invention has been achieved.

More specific optional features of the invention are indicated in the dependent claims.

In an embodiment, the first side of the print medium is free from direct engagement by the holding device. The holding force of the holding device is applied only to the second side of the print medium. The first side of the print medium is substantially entirely free, such that it can be efficiently exposed to the steam and/or to prevent deformation by pushing forces on the first side. Preferably, the holding device pulls on the second side of the print medium. In a preferred embodiment, the holding device and/or the conveyor engage only the second side of the sheet.

In an embodiment, the holding device is positioned partially within the conveyor. The holding device is comprised in the conveyor, such that the holding force of the holding device on the print medium results in and/or contributes to a transport force which the conveyor exerts on the print medium to move the print medium. Preferably, the holding force comprises a normal force on the print medium, resulting in an increased frictional interaction or force between the conveyor and the second side of the print medium, such that the print medium moves synchronously with the conveyor.

In an embodiment, the conveyor defines a substantially flat medium support plane, wherein the second side of the print medium faces the medium support plane when the print medium is on the conveyor. The conveyor comprises or defines a planar portion or area, preferably parallel to the horizontal plane during use. The holding device forces the print medium to assume the flat shape defined by the print medium support plane. It will be appreciated that substantially flat may include local variations in height across the print medium support plane in consequence of allowing the holding force to engage the print medium.

In an embodiment, wherein the holding device is configured to engage the print medium through the medium support plane. The holding force of the holding device is applied via or through the medium support plane, such that the print medium is flattened against the print medium support plane of the conveyor. This allows the holding force to be easily applied to the second side of print medium which faces the conveyor. The medium support plane of the conveyor may for example comprise openings which allow for the application of the holding force on the second side of the print medium.

In an embodiment, wherein the conveyor comprises an endless, air permeable transport belt. The belt is supported on a plurality of rollers, at least one which is connected to a drive for driving the respective roller and thereby the belt in cyclic motion. The belt is air permeable by means of e.g. openings and/or through-holes in the belt material, which allow for the application of the holding force through the belt. The belt is supported, such that it comprises a planar section, which forms the medium support plane. Aside from the rollers, additional support members may be provided to support the belt and/or to define the flatness of the medium support plane.

In an embodiment, the holding device comprises a suction device for applying a negative pressure to the second side of the print medium. The negative pressure applied to the second side of the print medium by the suction device urges the print medium flat against the medium support plane. The negative pressure is preferably applied through the medium support plane, preferably through the openings in the belt. In another embodiment, the holding device further comprises a suction source in fluid connection to a suction chamber, which suction chamber is positioned adjacent the transport belt. The suction source may for example be a pump or fun which draws in steam and/or air through the belt and through the suction chamber. The suction chamber is adjacent the belt and open towards the belt. Viewed perpendicular to the belt, the suction chamber defines and/or overlaps the medium support plane. While the suction chamber is open on the belt side, it may comprise one or support members for supporting the belt, such as beams or rollers. The support members are positioned in a common, preferably during use horizontal, plane, such that the section of the belt over the support members is substantially flat.

In another embodiment, the suction source is further in fluid connection to a steam return channel, such that steam which has been sucked into the suction chamber may be returned to the steam chamber via the steam return channel. The suction device removes steam from the steam chamber by drawing it into the suction chamber through uncovered sections of the belt. Thereby, the steam content or level inside the steam chamber is negatively affected and in such a case, the steam generator has to be controlled to compensate for this sucking away of steam. The suction device returns the sucked away steam or at least a portion thereof back to the steam chamber via the steam return channel. The steam return channel is preferably a line downstream of the suction source, which connects an outlet of the suction source to an inlet on the housing of the steam chamber. Thereby, steam that exits the steam chamber via the suction device is returned to the steam chamber. This reduces the operational load on the steam generator, resulting in among others lower power consumption.

In an embodiment, the steam return channel is in fluid connection to a steam supply channel which is arranged to supply steam from the steam generator to the steam chamber. Prior to entering the steam chamber, the returned steam is mixed with steam coming from the steam generator. Mixing the returned steam with freshly generated steam allows for a more homogenous application of steam to the print medium and improved control over conditions in the steam chamber.

In an embodiment, the print medium treatment device further comprises an atmospheric sensor positioned inside the steam chamber for detecting at least one atmospheric condition, preferably a pressure, oxygen level, a temperature, and/or a humidity level, wherein a controller is configured to control the steam generator based upon the detected at least one atmospheric condition. The flow of steam from the steam generator into the steam chamber is regulated based on the detected atmospheric conditions. The flow may be adjusted by controlling a heater and/or blower of the steam generator based a comparison of the sensed atmospheric condition to a predetermined setpoint. The setpoint has been selected in correspondence to the properties of the print media, for example when a media type is selected from the media catalogue. In this, manner the (partial) pressure and/or temperature inside the steam chamber may be set and kept to the desired conditions for a certain print medium type. The steam through the steam return channel may herein also be regulated similarly.

In an embodiment, a drive for driving the conveyor is positioned outside the steam chamber. One or more drives are connected to one or more rollers supporting the belt. The at least one drive, such as a motor, is positioned outside of the housing of the steam chamber, so that the drive is not directly exposed to the steam. The drive is provided with transmission means that extend through the housing into the steam chamber to transfer a torque from the drive to the at least one roller to drive the belt.

In an embodiment, the print medium treatment device further comprises a controller storing a media catalogue, wherein an operational range for the steam generator has been defined for each print medium in the media catalogue. The media catalogue couples a media type of a print medium to a predefined range wherein the team generator should operator to achieve the corresponding conditions inside the steam generator. The range may be defined in any suitable format, such as setting for power, (partial) pressure, temperature, humidity etc. The controller is configured to compare the detected atmospheric condition from the sensor to the range to control the steam generator. In another embodiment, the controller is configured to adjust the pressure in the steam chamber proportional to a grammage of the print medium.

The invention further relates to a printer comprising a print medium treatment device as described above. The printer preferably is an inkjet printer, wherein the print medium treatment device is positioned downstream of a fixation unit for fixing and/or drying a marking material jetted onto the print medium by a printing assembly. A transport path of the printer carries therein the freshly printed print medium from the printing assembly to the fixation unit, where the jetted marking material on the print medium is fixed and/or dried into a substantially solid state. The fixing or drying process may affect the appearance of the marking material and/or the print medium, which appearance can be adjusted by a subsequent steam treatment.

The invention further relates to a method for treating a print medium in a printer, comprising the steps of:

- transporting the print medium held onto a conveyor by means of a negative pressure through a steam chamber, wherein the print medium is exposed to steam; and
- returning at least a portion of steam sucked from the steam chamber by means of the negative pressure back to the steam chamber.

The method may be performed in any of the embodiments described above. In an embodiment, steam is applied to a first side of a print medium facing away from the conveyor and the print medium is held onto the conveyor by a holding device engaging only a second side of the print medium opposite the first side.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
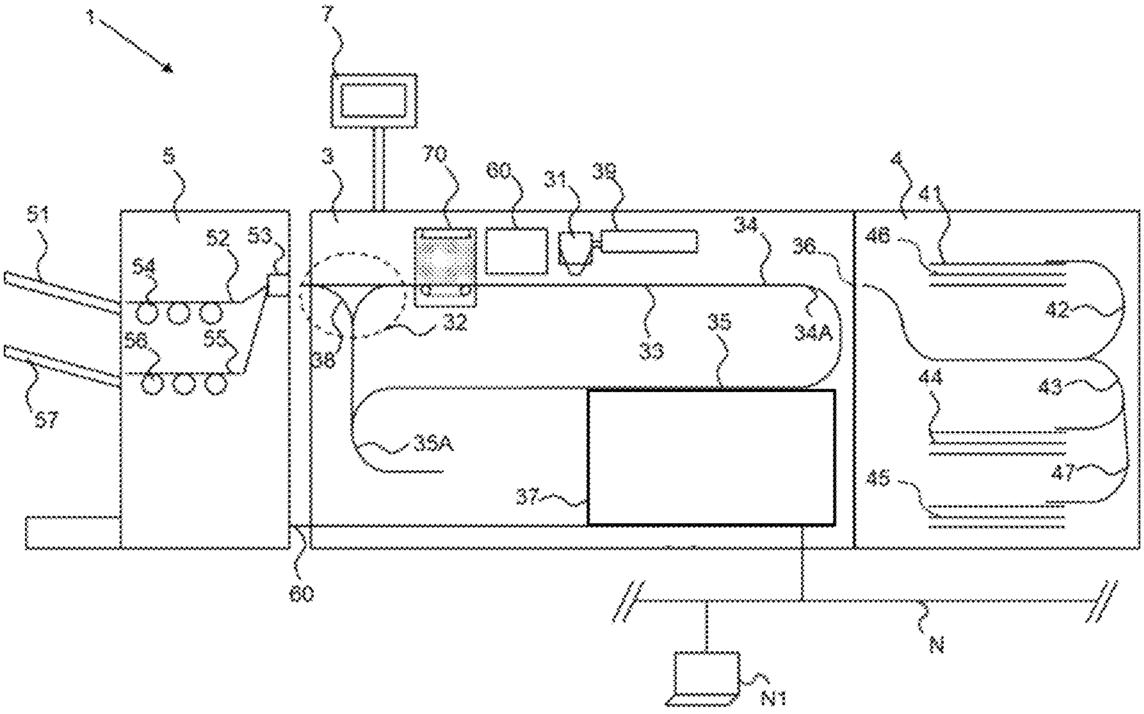
FIG. 1 is a schematic, side view of an inkjet sheet printer.

The present invention will now be described with reference to the accompanying drawings, wherein the same reference numerals have been used to identify the same or similar elements throughout the several views.

FIG. 1 shows schematically an embodiment of a printing system 1 according to the present invention. The printing system 1, for purposes of explanation, is divided into an output section 5, a print engine and control section 3, a local user interface 7 and an input section 4. While a specific printing system is shown and described, the disclosed embodiments may be used with other types of printing system such as an ink jet print system, an electrographic print system, etc.

The output section 5 comprises a first output holder 52 for holding printed print medium, for example a plurality of sheets. The output section 5 may comprise a second output holder 55. While 2 output holders are illustrated in FIG. 1, the number of output holders may include one, two, three or more output holders. The printed print medium is transported from the print engine and control section 3 via an inlet 53 to the output section 5. When a stack ejection command is invoked by the controller 37 for the first output holder 52, first guiding means 54 are activated in order to eject the plurality of sheets in the first output holder 52 outwards to a first external output holder 51. When a stack ejection command is invoked by the controller 37 for the second output holder 55, second guiding means 56 are activated in order to eject the plurality of sheets in the second output holder 55 outwards to a second external output holder 57.

The output section 5 is digitally connected by means of a cable 60 to the print engine and control section 3 for bi-directional data signal transfer.

The print engine and control section 3 comprises a print engine and a controller 37 for controlling the printing process and scheduling the plurality of sheets in a printing order before they are separated from input holder 44, 45, 46.

Resources may be recording material located in the input section 4, marking material located in a reservoir 39 near or in the print head or print assembly 31 of the print engine, or finishing material located near the print head or print assembly 31 of the print engine or located in the output section 5 (not shown).

The paper path comprises a plurality of paper path sections 32, 33, 34, 35 for transporting the print medium from an entry point 36 of the print engine and control section 3 along the print head or print assembly 31 to the inlet 53 of the output section 5. The paper path sections 32, 33, 34, 35 form a loop according to the present invention. The loop enables the printing of a duplex print job and/or a mix-plex job, i.e. a print job comprising a mix of sheets intended to be printed partially in a simplex mode and partially in a duplex mode.

The print head or print assembly 31 is suitable for ejecting and/or fixing marking material to the print medium 41. The print head or print assembly 31 is positioned near the paper path section 34. The print head or print assembly 31 may be an inkjet print head, a direct imaging toner assembly or an indirect imaging toner assembly. Downstream of the print assembly 31 a fixation unit 60 is provided along the paper path section 33. The fixation unit 60 comprises means for fixing the marking material to the print medium 41. Such means generally are arranged for rapidly transferring energy to the print medium 41 to induce a phase to dry the marking material. These means may include dryers, such as (radiation) heaters, (impingement) blowers, suction devices, etc, as commonly known in the state of the art. Downstream of the fixation unit 60 a treatment device 70 extends along the paper path section 33 to treat the print media 41 that have undergone fixation in the fixation unit 60. The treatment device 70 may be a steam treatment device arranged to expose the print medium 41 to heated or even superheated steam. Steam is known to interact favourably with the dried marking material and/or print media 41 and allows control over the final properties of the marking material and/or print media 41. For example, the glossiness level of the marking material may be controlled by steam treatment after fixation. The steam may for example be utilized to remove certain residual substances from the dried marking material, induce a reaction in the marking material, and/or adjust the humidity of the print medium.

While an print medium is transported along the paper path section 34 in a first pass in the loop, the print medium receives the marking material through the print head or print assembly 31. A next paper path section 32 is a flip unit 32 for selecting a different subsequent paper path for simplex or duplex printing of the print medium. The flip unit 32 may be also used to flip a sheet of print medium after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

In case of duplex printing on a sheet or when the curved section 38 is not present, the sheet is transported along the loop via paper path section 35A in order to turn the sheet for enabling printing on the other side of the sheet. The sheet is transported along the paper path section 35 until it reaches a merging point 34A at which sheets entering the paper path section 34 from the entry point 36 interweave with the sheets coming from the paper path section 35. The sheets entering the paper path section 34 from the entry point 36 are starting their first pass along the print head or print assembly 31 in the loop.

The sheets coming from the paper path section 35 are starting their second pass along the print head or print assembly 31 in the loop. When a sheet has passed the print head or print assembly 31 for the second time in the second pass, the sheet is transported to the inlet 53 of the output section 5.

The input section 4 may comprise at least one input holder 44, 45, 46 for holding the print medium before transporting the sheets of print medium to the print engine and control section 3. Sheets of print medium are separated from the input holders 44, 45, 46 and guided from the input holders 44, 45, 46 by guiding means 42, 43, 47 to an outlet 36 for entrance in the print engine and control section 3. Each input holder 44, 45, 46 may be used for holding a different kind of print medium, i.e. sheets having different media properties. While 3 input holders are illustrated in FIG. 1, the number of input holders may include one, two, three or more input holders.

The local user interface 7 is suitable for displaying user interface windows for controlling the print job queue residing in the controller 37. In another embodiment a computer N1 in the network N has a user interface for displaying and controlling the print job queue of the printing system 1.

Steam treatment Device

Figure 2:
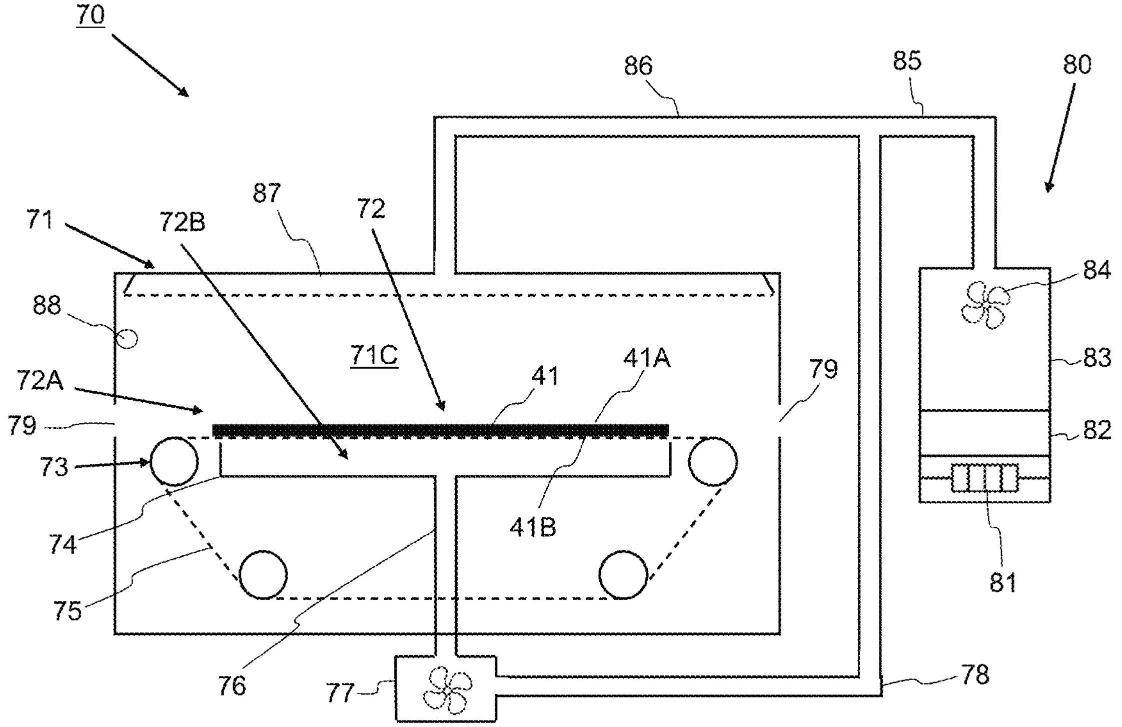
FIG. 2 is a schematic, cross-sectional view of a print medium treatment device of the printer in FIG. 1.

FIG. 2 illustrates a treatment device 70 for treating print media 41 by exposure to steam. The treatment device 70 comprises a housing 71 defining a steam chamber 71C. The housing 71 is preferably sealed from the ambient environment with the exception of the openings 79, the inlet channel 86, and the outlet channel 79. The housing 71 may be further be thermally isolated to improve temperature control within the steam chamber 71C.

A steam generator 80 is provided in fluid connection to the steam chamber 71C via the inlet channel 86. The steam generator 80 comprises a liquid reservoir 82 adjacent a heater 81, so that steam may be generated and accumulated in the accumulator chamber 83. In the example in FIG. 2, the liquid reservoir 82 comprises water, which may be heated via an electric heater 81, but other steam generating means may be applied as well. Preferably, the steam generator 80 is configured to generate superheated steam, i.e. steam at a temperature higher than its vaporization point at the absolute pressure where said temperature is measured. The accumulator chamber 83 is connected to a blower 84, such as fan or pump, for driving the generated steam via the accumulator channel 85 into the inlet channel 86 and further into the steam chamber 71C. The inlet channel 86 is connected to a steam distributor 87 for distributing the steam substantially homogenously over the area of the print medium 41. Inside the steam chamber 71C an atmospheric sensor 88 is provided to detect one or more atmospheric conditions, such as (partial) pressure, humidity, temperature, etc. Data from the sensor 88 is transmitted to the controller 37, which controls the steam generator 80 based on said data. Thus, the conditions inside the steam chamber 71C may be adjusted based on a type of print medium 41 and/or the composition and/or amount of marking material on the print medium 41. Thereto, the controller stores a media catalogue, wherein for each print media type one or more parameters defining the atmospheric conditions in the steam chamber 71C have been defined. The media catalogue may be in any suitable format, such as a look-up table, algorithm, or formula.

Inside the steam chamber 71C an endless transport belt 75 of a conveyor 72A is provided. The belt 75 is movable supported on a plurality of rollers 73. At least one of the rollers 73 is connected to a drive to rotate said roller and thereby the belt 75. The drive is positioned outside the housing 71 of the steam chamber 71C, so that it is not exposed to steam. Suitable bearings may be provided in the housing to transmit a drive shaft from the drive to one of the rollers 73. Inside the steam chamber 71C the first side 41A of the print medium 41 faces away from the conveyor 72A, while the second side 41B of the print medium 41 contacts the conveyor 72A. Thereby, the first side 41A of the print medium 41 is free to be exposed to steam inside the steam chamber 71C.

The belt 75 is formed of a steam resistant material, which has been selected to withstand e.g. the high humidity and/or temperatures in the steam chamber 71C. The belt 75 may for example be formed of a suitable plastic, such as polyether ether ketone (PEEK) or any other suitable material. The belt 75 is air permeable, for example by means of a plurality of openings or through-holes provided in its surface. Below the belt a suction chamber 74 is provided in fluid connection to a suction source 77 by means of the suction channel 76 for forming a holding device 72B. Between the upper rollers 73, the belt 75 defines a print medium support plane. The suction chamber 74 may be provided with one or more support members, which contact and support the belt 75 to achieve a substantially flat print medium support plane. The side of the suction chamber 74 facing the belt 75 is open, such that gas, specifically air, may be sucked in through the openings in the belt 75 by means of the suction source 77. In this manner a negative pressure may be applied to a side of the print medium 41 facing the belt 75, such that the print medium 41 is flattened against the belt 75. The holding device 72B is preferably configured to engage the print medium 41 only at the side facing the belt 75, such that the opposite side of the print medium 41 is free from direct contact with the holding device 72B. The print medium support plane is preferably substantially flat, such that the print medium 41 is also flattened by the negative pressure parallel to said plane. Thereby, deformations in the print medium 41 during its exposure to steam are prevented, as the print medium 41 is held flat against the conveyor 72A by the holding device 72B during steam treatment: the negative pressure exerts a constant holding force on the second side of the print medium 41, keeping it flat against the belt 75. The conveyor 72A is arranged to operate at a substantially constant speed during operation, wherein print media 41 are fed into the housing 71 onto the belt 75 via one of the openings 79 and exit after steam treatment via the other of the openings 79. This allows for a highly productive printing process. In FIG. 2, the conveyor 72A and the holding device 72B are both comprised in the transport device 72.

Steam is also is sucked into the suction chamber 74 via uncovered openings in the belt 75, between and/or besides print media 41. The steam which enters the suction chamber 74 is driven by the suction source 77 via the steam return channel 78 to the inlet channel 86. There, the returned steam is mixed with freshly generated coming from the steam generator 80. By returning steam sucked in through the suction chamber 74, the loss of steam via the holding device 72B is reduced and/or prevented. This reduces the load on the steam generator 80, allowing for reduced operational and/or component costs. The steam return channel 78 may comprise a regulator, such as a valve, to adjust the flow of returned steam in the inlet channel 86. It will be appreciated that in another embodiment, the steam return channel 78 may also connect directly to an opening in the housing 71, such that it effectively forms a channel parallel to the inlet channel 86. The steam return channel 78 provides a fluid connection from the suction chamber 74 to an inlet in the housing 71, such that steam can easily be recycled by means of the suction source 77. The suction source 77 may for example be a fan or pump, preferably one configured to operate under humid conditions.

Upon entering the housing 71 via one of the openings 79, a print medium 41 is forced flat against the belt 75. The negative pressure of the suction source 77 holds the print medium 41 flat against the belt 75, so that the print medium 41 is substantially unable to deform. While fixed on the belt 75, the print medium 41 is exposed to heated steam. Print media 41, such as paper are prone to deform under humid atmospheric conditions, such as steam treatment. One example of such deformation is (local) wrinkling of the print medium 41. This deformation is however prevented, since the print medium 41 is held securely flat on the print medium support plane formed by the belt 75. In consequence, the print medium 41 and/or the marking material on it can be treated with (heated) steam with a reduced risk of deformation and/or substantially without deformation. By recycling the steam sucked in by the holding device from the steam chamber 71C back into the steam chamber 71C, the costs of such a treatment device 70 are kept relatively low.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A print medium treatment device for a printer comprising:
- a steam treatment unit for treating a first side of a print medium with steam, the steam treatment unit comprising a steam generator connectable to a steam chamber;
- a conveyor for transporting the print medium through the steam chamber, the conveyor comprising a holding device for engaging a second side of the print medium opposite the first side, such that the print medium is flattened against the conveyor; and
- wherein the holding device is positioned partially within the conveyor.

2. The print medium treatment device according to claim 1, wherein the conveyor comprises an endless, air permeable transport belt.

3. The print medium treatment device according to claim 2, wherein the steam treatment unit comprises a housing defining the steam chamber, and
- wherein the transport belt is positioned inside the housing.

4. The print medium treatment device according to claim 3, wherein the transport belt is positioned fully inside the housing.

5. The print medium treatment device according to claim 4, wherein a drive for driving the conveyor is positioned outside the steam chamber.

6. The print medium treatment device according to claim 2, wherein the holding device comprises a suction device for applying a negative pressure to the second side of the print medium.

7. The print medium treatment device according to claim 6, wherein the holding device further comprises a suction source in fluid connection to a suction chamber, the suction chamber being positioned adjacent the transport belt.

8. The print medium treatment device according to claim 7, wherein the suction source is further in fluid connection to a steam return channel, such that steam which has been sucked into the suction chamber may be returned to the steam chamber via the steam return channel.

9. The print medium treatment device according to claim 8, wherein the steam return channel is in fluid connection to a steam supply channel which is arranged to supply steam from the steam generator to the steam chamber.

10. The print medium treatment device according to claim 9, further comprising an atmospheric sensor positioned inside the steam chamber for detecting at least one atmospheric condition,
- wherein a controller is configured to control the steam generator based upon the detected at least one atmospheric condition.

11. The print medium treatment device according to claim 9, further comprising an atmospheric sensor positioned inside the steam chamber for detecting at least one atmospheric condition,
- wherein a controller is configured to control the steam generator based upon the detected at least one atmospheric condition, and
- wherein the at least one atmospheric condition is pressure, oxygen level, temperature, or humidity level.

12. The print medium treatment device according to claim 1, wherein the steam generator is a superheated steam generator configured for generating steam at a temperature higher than a vaporization point thereof at an absolute pressure where the temperature is measured.

13. The print medium treatment device according to claim 12, further comprising a controller storing a media catalogue, wherein an operational range for the steam generator has been defined for each print medium in the media catalogue.

14. A printer comprising the print medium treatment device according to claim 1.

15. A method for treating a print medium in the printer according to claim 1, comprising the steps of:
- transporting the print medium held onto a conveyor by means of a negative pressure through a steam chamber, wherein the print medium is exposed to steam; and
- returning at least a portion of steam sucked from the steam chamber by means of the negative pressure back to the steam chamber.

16. The method according to claim 15, wherein steam is applied to a first side of a print medium facing away from the conveyor and the print medium is held onto the conveyor by a holding device engaging only a second side of the print medium opposite the first side.

17. A print medium treatment device for a printer comprising:
- a steam treatment unit for treating a first side of a print medium with steam, the steam treatment unit comprising a steam generator connectable to a steam chamber; and
- a conveyor for transporting the print medium through the steam chamber, the conveyor comprising a holding device for engaging a second side of the print medium opposite the first side, such that the print medium is flattened against the conveyor,
- wherein the conveyor defines a substantially flat medium support plane, and
- wherein the second side of the print medium faces the medium support plane when the print medium is on the conveyor.

18. The print medium treatment device according to claim 17, wherein the holding device is configured to engage the print medium through the medium support plane.

* * * * *